W. D. AYERS.
Attachment for Lawn Mowers.

No. 210,654. Patented Dec. 10, 1878.

Attest:
Courtney A. Cooper
William Paxton.

Inventor:
W. D. Ayers
By his attorney
Charles E. Foster

UNITED STATES PATENT OFFICE.

WILSON D. AYERS, OF ELMIRA, NEW YORK, ASSIGNOR OF ONE-HALF HIS RIGHT TO DANIEL M. MACKEY, OF SAME PLACE.

IMPROVEMENT IN ATTACHMENTS FOR LAWN-MOWERS.

Specification forming part of Letters Patent No. 210,654, dated December 10, 1878; application filed September 30, 1878.

*To all whom it may concern:*

Be it known that I, WILSON D. AYERS, of Elmira, Chemung county, New York, have invented Improvements in Attachments for Lawn-Mowers, of which the following is the specification:

The object of my invention is to provide an effective means of collecting and disposing of the grass cut by an ordinary lawn-mower, providing an attachment which can readily be applied to and adjusted upon a mower.

Figure 1:
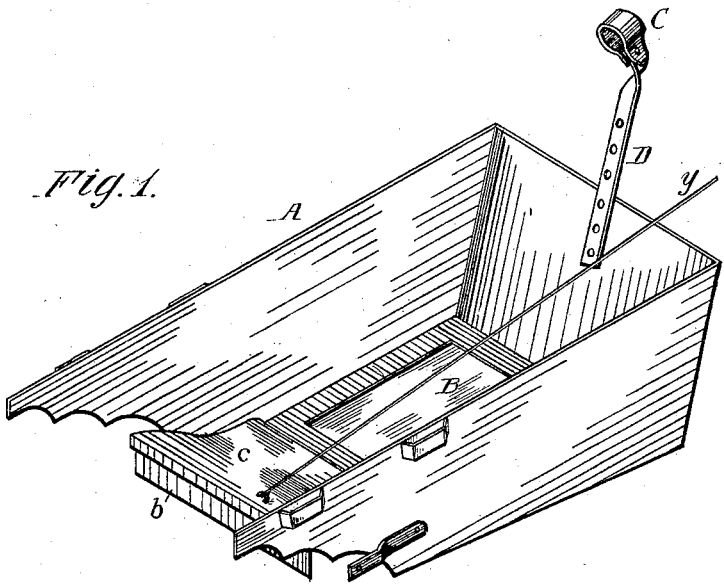
Figure 2:
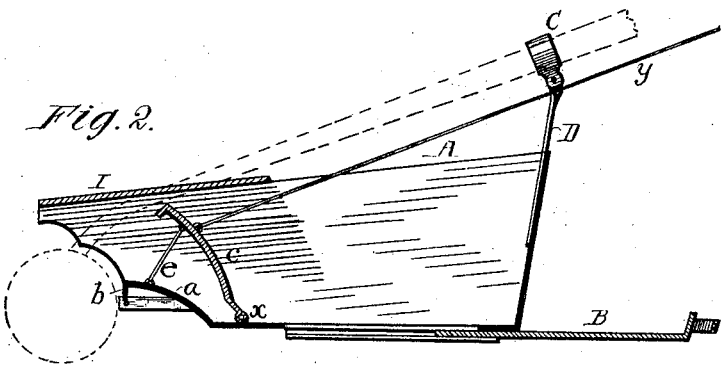

In the accompanying drawings, which form part of this specification, Figure 1 is a perspective view, illustrating my improved attachment; and Fig. 2, a longitudinal section.

A represents a reservoir or box, of metal or other suitable material, and of such shape or size that it may be applied behind the cutter of the lawn-mower, to which it is adapted.

In the present instance the box is deepest at the rear, open at the front end, near the top, and the sides extend forward and are curved to fit the frame of the mower, to which the box is suitably secured.

The bottom of the box has an upward-curved projection, $a$, at the front, with a pendent wing or curtain, $b$; and between the sides is pivoted, at $x$, a shield or wing, $c$, which, when down, conforms in shape to and covers the plate $a$, and is drawn toward the latter by a spring, $e$, suitably arranged.

The box is provided with a sliding bottom, B, and with a ring or yoke, C, connected to a bar, D, adjustable upon the rear end of the box; and a cap, I, which overhangs the cutter, is applied detachably to the top, near the front.

The grass as it is cut is thrown upon the shield $c$, lying in the position shown in Fig. 1, the wing $b$ preventing any grass from adhering to the cutters. Should the grass accumulate at the front, as it will in a short time, the attendant, by drawing upon a cord or rod, $y$, secured to the shield or to a crank of the pivot-shaft $x$, throws the grass back into the body of the box, the spring $e$ restoring the shield immediately to its first position.

When the box is filled its contents may be dumped at one spot by drawing back the bottom B.

The cover I, overhanging the cutter, prevents the grass from being thrown from the box, while the adjustable bar D and ring or yoke C enable the attachment to be secured to and adjusted upon the handle of the mower.

I claim—

1. The box A, open at the front, provided with the plate $a$ at the rear of the cutter, and with the hinged shield $c$ and operating cord or rod $y$, substantially as set forth.

2. The combination of the box A, ring C, adapted to the handle of the mower, and bar D, adjustable on the box, as set forth.

In testimony whereof, I have signed my name to this specification in the presence of two subscribing witnesses.

WILSON D. AYERS.

Witnesses:
    ARCHIBALD ROBERTSON,
    J. S. FASSETT.